United States Patent
Huang et al.

(10) Patent No.: US 12,486,365 B2
(45) Date of Patent: Dec. 2, 2025

(54) POROUS AEROGEL SCAFFOLD, METHOD OF PREPARING THE SAME AND USE THEREOF

(71) Applicants: SHANDONG UNIVERSITY, Shandong (CN); YANSHAN UNIVERSITY, Hebei (CN)

(72) Inventors: Chuanzhen Huang, Qinhuangdao (CN); Zhichao Wang, Jinan (CN); Hanlian Liu, Jinan (CN); Peng Yao, Jinan (CN); Wei Wang, Jinan (CN); Zhen Wang, Qinhuangdao (CN); Longhua Xu, Qinhuangdao (CN); Shuiquan Huang, Qinhuangdao (CN); Jun Wang, Qinhuangdao (CN); Hongtao Zhu, Jinan (CN); Bin Zou, Jinan (CN)

(73) Assignees: SHANDONG UNIVERSITY, Jinan (CN); YANSHAN UNIVERSITY, Hebei (CN)

( * ) Notice: Subject to any disclaimer, the term of this patent is extended or adjusted under 35 U.S.C. 154(b) by 30 days.

(21) Appl. No.: 18/692,195

(22) PCT Filed: Jan. 11, 2022

(86) PCT No.: PCT/CN2022/071218
§ 371 (c)(1),
(2) Date: Mar. 14, 2024

(87) PCT Pub. No.: WO2023/087523
PCT Pub. Date: May 25, 2023

(65) Prior Publication Data
US 2025/0002660 A1    Jan. 2, 2025

(30) Foreign Application Priority Data
Nov. 16, 2021   (CN) .......................... 202111353695.8

(51) Int. Cl.
| | | |
|---|---|---|
| C08J 3/075 | (2006.01) | |
| C08J 3/28 | (2006.01) | |
| C08J 9/26 | (2006.01) | |
| C08J 9/28 | (2006.01) | |
| C12N 5/00 | (2006.01) | |
| B33Y 80/00 | (2015.01) | |

(52) U.S. Cl.
CPC ................. *C08J 3/075* (2013.01); *C08J 3/28* (2013.01); *C08J 9/26* (2013.01); *C08J 9/28* (2013.01); *C12N 5/0062* (2013.01); *B33Y 80/00* (2014.12); C08J 2201/046 (2013.01); C08J 2201/0484 (2013.01); C08J 2205/026 (2013.01); C08J 2371/02 (2013.01); C12N 2533/30 (2013.01)

(58) Field of Classification Search
CPC .... C08J 3/075; C08J 2205/026; C12N 5/0062
See application file for complete search history.

(56) References Cited

U.S. PATENT DOCUMENTS

2020/0054791 A1   2/2020   Choonara et al.

FOREIGN PATENT DOCUMENTS

| CN | 106474560 A | 3/2017 |
|---|---|---|
| CN | 108888803 A | 11/2018 |
| CN | 109124821 A | 1/2019 |
| CN | 110804193 A | 2/2020 |
| CN | 111450324 A | 7/2020 |
| CN | 111574816 A | 8/2020 |
| CN | 112999425 A | 6/2021 |
| CN | 113290844 A | 8/2021 |
| CN | 113320144 A | 8/2021 |
| WO | 2017/187114 A1 | 11/2017 |
| WO | 2019/074314 A1 | 4/2019 |

OTHER PUBLICATIONS

Aug. 26, 2022 International Search Report issued in International Patent Application No. PCT/CN2022/071218.
Aug. 26, 2022 Written Opinion issued in International Patent Application No. PCT/CN2022/071218.
May 5, 2022 Office Action issued in Chinese Patent Application No. 202111353695.8.
Jun. 7, 2023 Office Action issued in Chinese Patent Application No. 202111353695.8.
Jul. 17, 2023 Office Action issued in Chinese Patent Application No. 202111353695.8.
Aimin Tang et al. "Nanocellulose/Pegda Aerogel Scaffolds With Tunable Modulus Prepared by Stereolithography for Three-Dimensional Cell Culture". Journal of Biomaterials Science, 2019, vol. 30, No. 10, pp. 797-814.
Aimin Tang et al. "Fabrication of Nanocellulose/Pegda Hydrogel by 3D Printing". Rapid Prototyping Journal, 2018, vol. 24, No. 8, pp. 1265-1271.

*Primary Examiner* — Genevieve S Alley
(74) *Attorney, Agent, or Firm* — Oliff PLC

(57) ABSTRACT

A method for prepring a porous aerogel scaffold includes: adding a photoinitiator and polyethylene glycol diacrylate in a buffer solution, dissolving by heating and evenly mixing, adding Pluronic® F127 (Poloxamer 407) into the mixed solution, and standing at a low temperature to obtain an aerogel scaffold material; printing a hydrogel scaffold by using a 3D printing technology, and performing UV irradiation so that a cross-linking of the hydrogel scaffold is caused to form a three-dimensional scaffold with a stable structure, performing low-temperature soaking to remove Pluronic® F127 (Poloxamer 407), and then freeze drying the three-dimensional scaffold to obtain the porous aerogel scaffold. Wherein, Pluronic® F127 (Poloxamer 407) serves as a sacrificial material which is removed after the 3D printing of the hydrogel scaffold is completed, and then a porous structure can be formed in the scaffold in combination with a freeze drying technology, which facilitates the survival, growth and proliferation of cells during the three-dimensional culture.

5 Claims, 6 Drawing Sheets

POROUS AEROGEL SCAFFOLD, METHOD OF PREPARING THE SAME AND USE THEREOF

TECHNICAL FIELD

The present invention belongs to the technical field of biomaterials, and in particularly to a porous aerogel scaffold, and a preparation method and an application thereof. The porous aerogel scaffold can be used for a three-dimensional cell culture.

BACKGROUND

The statements in this section only provide the background art related to the present invention, and do not necessarily constitute the prior art.

Tissue engineering scaffolds can provide a three-dimensional environment for cell growth. In many types of tissue engineering scaffolds, the aerogel scaffold has been applied widely because it can provide adhesive sites for adherent growth of cells due to many microporous structures on the surface thereof.

At present, a material for preparing the aerogel includes a natural material, a synthetic material and a composite material. Preparation methods mainly include two steps, i.e., the cross-linking of the material is caused to prepare a hydrogel, and then the hydrogel is subjected to freeze drying, so as to finally prepare the aerogel scaffold.

However, among the existing methods for preparing aerogels, the aerogels are prepared by mold casting in most cases. In such a way, the prepared aerogels have simple structures, i.e., most of them are ordinary cylindrical and/or three-dimensional block structures, indicating that there is a lack of macro-pore-channels for nutrient exchange. In addition, for the microporous structure design of the aerogel scaffold, most of the studies rely solely on the characteristics of the material itself, whereas there are relatively few researches on human control.

SUMMARY

Aiming at the defects in the prior art, it is an objective of the present invention to provide a porous aerogel scaffold, a method for preparing the same and use thereof.

In order to achieve the above objective, the present invention is achieved by the following technical solutions:

In the first aspect, the present invention provides a method for preparing a porous aerogel scaffold, comprising the following steps:

adding a photoinitiator and polyethylene glycol diacrylate in a buffer solution, dissolving by heating and evenly mixing, then adding Pluronic® F127 (Poloxamer 407) into the mixed solution, and standing at a low temperature to obtain an aerogel scaffold material; and printing a hydrogel scaffold by using a 3D printing technology, performing UV irradiation so that the cross-linking of the hydrogel scaffold is caused to form a three-dimensional scaffold with a stable structure, performing low-temperature soaking to remove the Pluronic® F127 (Poloxamer 407), and then obtaining the porous aerogel scaffold after performing freeze drying.

In the second aspect, the present invention provides a porous aerogel scaffold prepared by the method.

In the third aspect, the present invention provides use of the porous aerogel scaffold in a three-dimensional cell culture.

One or more embodiments of the present invention have the following beneficial effects:

Both the Pluronic® F127 (Poloxamer 407) and polyethylene glycol diacrylate have good biocompatibility and can be applied to cell culture; meanwhile, both of two are synthetic materials that do not contain biological structures, which can be used as basic materials. In addition, other components are added therein according to specific application environments.

By utilizing the 3D printing technology, an aerogel scaffold with a complicated structure can be prepared.

The Pluronic® F127 (Poloxamer 407) serves as a sacrificial material that is removed after the 3D printing of the hydrogel scaffold is completed, combining with a freeze drying technology, a porous structure can be formed in the scaffold subsequently, which facilitates the survival, growth and proliferation of the cells during the three-dimensional cell culture.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1A:
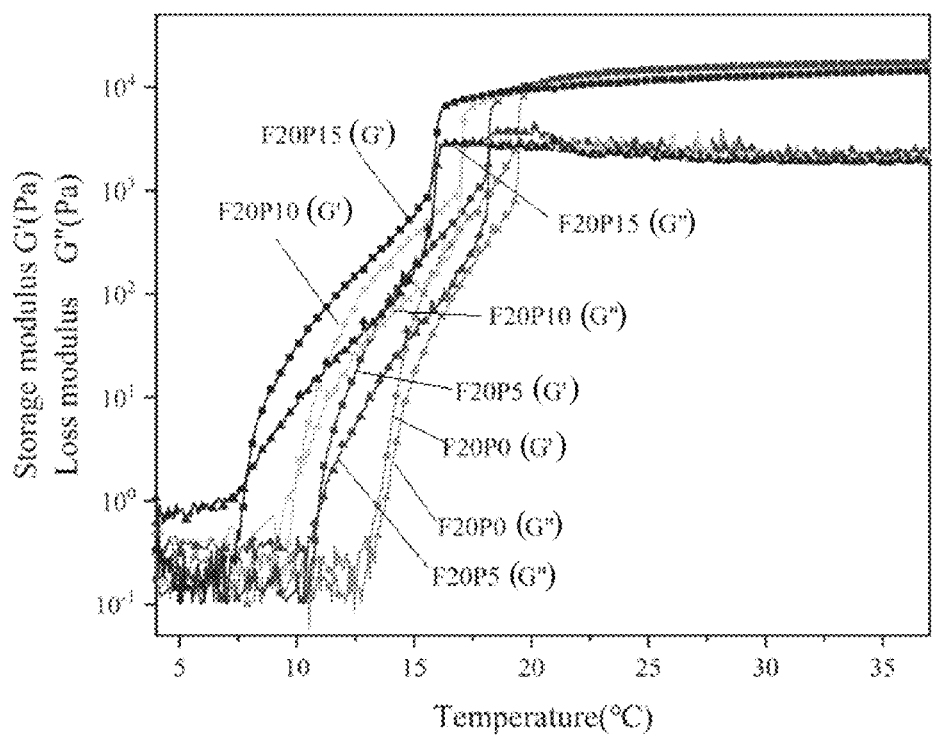
FIG. 1 includes diagrams showing rheological properties of biomaterials prepared in Example 1, Example 2 and Example 3 according to the present invention, wherein DIAG. a shows gelation kinetic characteristics of gel, DIAG. b shows shear thinning characteristics of gel, and DIAG. c shows shear recovery characteristics of gel.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

In the first aspect, the present invention provides a method for preparing a porous aerogel scaffold, the method comprising the following steps:

adding a photoinitiator and polyethylene glycol diacrylate in a buffer solution, dissolving by heating and evenly mixing, then adding a Pluronic® F127 (Poloxamer 407) into the mixed solution, and standing at a low temperature to obtain an aerogel scaffold material; and printing a hydrogel scaffold with the aerogel scaffold material by using a 3D printing technology, and performing UV irradiation so that the cross-linking of the hydrogel scaffold is caused to form a three-dimensional scaffold with a stable structure, performing low-temperature soaking to remove the Pluronic® F127 (Poloxamer 407), and then obtaining the porous aerogel scaffold after performing a freeze drying.

In some embodiments, the buffer solution is phosphate buffer saline (PBS).

In some embodiments, the photoinitiator is a lithium phenyl (2,4,6-trimethylbenzoyl) phosphinate (LAP) photoinitiator.

Further, a concentration of the LAP photoinitiator in the buffer solution is 0.1 to 0.25 wt %.

In some embodiments, a concentration of the polyethylene glycol diacrylate in the buffer solution is 5 to 15 wt %.

In some embodiments, a temperature of a water-bath heating is 35° C. to 40° C., and a duration time of the water-bath heating is 5 to 15 min; preferably, the temperature of the water-bath heating is 37° C., and the duration time of the water-bath heating is 10 min, during which, interval shaking is performed.

Further, shaking is performed every 1 to 3 minutes during the water-bath heating, so that the LAP photoinitiator is sufficiently dissolved.

In some embodiments, a concentration of the Pluronic® F127 (Poloxamer 407) in the aerogel scaffold material is 15 to 25 wt %.

Further, a standing temperature of the aerogel scaffold material is 0° C. to 5° C., and a standing time is 2 to 5 days, so that the Pluronic® F127 (Poloxamer 407) is sufficiently dissolved. Preferably, the standing temperature of the aerogel scaffold material is 4° C., and the standing time is 3 days.

In some embodiments, a wavelength of the UV is 405 nm.

Further, an intensity of the UV is 20 to 30 mW/cm$^2$, and an irradiation time is 5 to 15 minutes.

In some embodiments, the three-dimensional scaffold is subjected to low-temperature soaking with a PBS to remove the Pluronic® F127 (Poloxamer 407).

Further, a temperature of the low-temperature soaking is 0° C. to 5° C., a soaking time is 20 to 30 hours. Preferably, the temperature of the low-temperature soaking is 4° C., and the soaking time is 24 hours.

In some embodiments, a temperature of the freeze drying is −60° C. to −50° C., and a duration time of freeze drying is 20 to 30 hours.

In some embodiments, a step of sterilizing the prepared aerogel scaffold is also included.

Further, the aerogel scaffold is sterilized by using an ethanol solution.

Still further, the aerogel scaffold is subjected to a soaking sterilization by using the ethanol solution.

In the second aspect, the present invention provides a porous aerogel scaffold prepared by the method mentioned above.

In the third aspect, the present invention provides use of the porous aerogel scaffold in three-dimensional cell culture.

In some embodiments, a step of functionalizing the aerogel scaffold is also included prior to the cell culture.

Further, a step of the functionalizing is as follows: soaking the aerogel scaffold in a complete culture medium, and incubated in an environment of 37° C. and 5% $CO_2$ for a set time.

Still further, the time of incubation is 20 to 30 hours.

The principle of the present invention is as follows:

The Pluronic® F127 (Poloxamer 407) is a thermo-sensitive material, which behaves as a gel when the temperature is over a critical micelle temperature, and behaves a liquid when the temperature is below the critical micelle temperature. There are two effects by adding the Pluronic® F127 (Poloxamer 407) in bioink, which are that one effect is that the temperature of a receiving platform is higher than the critical micelle temperature of the material when the material is printed, the biomaterials is in a form of gel after falling on the receiving platform so as to ensure printability; the other effect is that the material is dissolved and volatilized when the scaffold, after printing, is placed in an environment whose temperature is lower than the critical micelle temperature, and the microporous structure of the scaffold can be adjusted in combination with the freeze drying technology, thereby facilitating the exchange of oxygen, nutrients and wastes, and improving the cell viability.

Polyethylene glycol diacrylate is a photocurable material. By adding the polyethylene glycol diacrylate to the bioink, after the printing of the scaffold is completed, the polyethylene glycol diacrylate is cured by utilizing UV irradiation, to improve the stability of the scaffold structure. The mechanical property of the scaffold can be regulated by adding different concentrations of the polyethylene glycol diacrylate in the bioink.

The 3D printing technology can be used to prepare the required structure according to the design, and the aerogel scaffold prepared by utilizing the 3D printing technology has a macrostructure and can provide a nutrient exchange channel for cells.

Next, the present invention will be further described in combination with embodiments and drawings.

Example 1

0.025 g of photoinitiator LAP was taken and poured into a brown bottle with a capacity of 20 mL, 7.475 g of PBS and 0.5 g of polyethylene glycol diacrylate were added into the bottle, the above materials were heated for 10 min in water bath at 37° C., during which, shaking was performed every 2 minutes, the solution was stored for 10 minutes at 4° C. after water-bath heating, and 2 g of Pluronic® F127 (Poloxamer 407) was taken and added into the solution, and then the mixed solution was subjected to standing for 3 days at 4° C. after 1 minute of shaking, to obtain a biomaterial.

The biomaterial was put into a bucket of a 10 cc printer having a 20G nozzle. Printing parameters were set as follows: an extrusion pressure was 50 kPa, a printing speed was 250 mm/min, a movement speed was 900 mm/min, movement lifting was 0, a pullback speed was 2000 mm/min, a pullback length was 0, and a printing manner was a one-by-one printing; the biomaterial was printed on a glass board which was placed on a receiving platform, and then a three-dimensional scaffold structure was formed by layer-by-layer stacking; wherein, temperatures of the bucket and the receiving platform were both set as 37° C., a layer height of the three-dimensional scaffold was 0.8 mm and a layer number was 3 layers, a number of repeated printing was 1 time, a spacing was 1.5 mm×1.5 mm, an included angle was 90°, a length was 12 mm, a width was 12 mm, the Brim Width was 1 mm, and the Brim speed was 200 mm/min. Then, the three-dimensional scaffold was irradiated for 10 min by using UV light with a wavelength of 405 nm and a light intensity of 25 mW/cm$^2$, so that the cross-linking of the biomaterial was caused to form a three-dimensional hydrogel scaffold with a stable structure. And then, PBS was added into the hydrogel scaffold, the hydrogel scaffold was incubated for 24 hours at 4° C., to remove the sacrificial material of the Pluronic® F127 (Poloxamer 407) in the hydrogel scaffold.

The hydrogel scaffold was pre-cooled for 12 hours at −80° C., and then subjected to freeze drying for 24 hours at the freeze drying temperature of −55° C., so as to prepare an aerogel scaffold. The aerogel scaffold was sterilized in 75% ethanol for 3 hours, and then washed with PBS 5 times with 5 minutes each time to completely remove ethanol. The sterilized aerogel scaffold was soaked in a complete culture medium, and then incubated for 24 hours in an environment of 37° C. and 5% $CO_2$, to functionalize the aerogel scaffold. A cell suspension, with a concentration of $10^6$ cells/mL, was added onto the functionalized aerogel scaffold, and then incubated in a cell incubator in an environment of 37° C. and 5% $CO_2$.

Example 2

0.025 g of photoinitiator LAP was taken and poured into a 20 mL brown bottle, 6.975 g of PBS and 1 g of polyethylene glycol diacrylate were added into the bottle, the above materials were heated for 10 minutes in water bath at 37° C., during which, shaking was performed every 2 minutes, the solution was stored for 10 minutes at 4° C. after water-bath heating, and subsequently 2 g of Pluronic® F127 (Poloxamer 407) was taken and added into the solution, and then the mixed solution was subjected to standing for 3 days at 4° C. after 1 minute of shaking, to obtain a biomaterial.

The biomaterial was put into a bucket of a 10 cc printer having a 20G nozzle. Printing parameters were set as follows: an extrusion pressure was 50 kPa, a printing speed was 250 mm/min, a movement speed was 900 mm/min, movement lifting was 0, a pullback speed was 2000 mm/min, a pullback length was 0, a printing manner was one-by-one printing, the biomaterial was printed on a glass board which was placed on a receiving platform, and then a three-dimensional scaffold structure was formed by layer-by-layer stacking. The temperatures of the bucket and the receiving platform were both set as 37° C. A layer height of the three-dimensional scaffold was 0.8 mm and a layer number was 3 layers, the number of repeated printing was 1 time, a spacing was 1.5 mm×1.5 mm, an included angle was 90°, a length was 12 mm, a width was 12 mm, the Brim Width was 1 mm and the Brim speed was 200 mm/min. Then, the three-dimensional scaffold was irradiated for 10 minutes by using UV light with a wavelength of 405 nm and a light intensity of 24 mW/cm$^2$, so that the cross-linking of the biomaterial was caused to form a three-dimensional hydrogel scaffold with a stable structure. And then, PBS was added into the hydrogel scaffold, the hydrogel scaffold was incubated for 24 hours at 4° C., to remove the sacrificial material of the Pluronic® F127 (Poloxamer 407) in the hydrogel scaffold.

The hydrogel scaffold was pre-cooled for 12 hours at −80° C., and then subjected to freeze drying for 24 hours at the freeze drying temperature of −55° C., so as to prepare an aerogel scaffold. The aerogel scaffold was sterilized in 75% ethanol for 3 hours, and then washed with PBS 5 times with 5 minutes each time to completely remove ethanol. The sterilized aerogel scaffold was soaked in a complete culture medium, and then incubated for 24 hours in an environment of 37° C. and 5% $CO_2$, and the scaffold was functionalized. A cell suspension, with a concentration of $10^6$ cells/mL, was added onto the functionalized aerogel scaffold, and then incubated in a cell incubator in an environment of 37° C. and 5% $CO_2$.

Example 3

0.025 g of photoinitiator LAP was taken and poured into a 20 mL brown bottle, 6.475 g of PBS and 1.5 g of polyethylene glycol diacrylate were added into the bottle, the above materials were heated for 10 minutes in water bath at 37° C., during which, shaking was performed every 2 minutes, the solution was stored for 10 minutes at 4° C. after water-bath heating, and subsequently 2 g of Pluronic® F127 (Poloxamer 407) was taken and added into the solution, and then the mixed solution was subjected to standing for 24 hours at 4° C. after 1 min of shaking, to obtain a biomaterial.

The biomaterial was put into a bucket of a 10 cc printer having a 20G nozzle. Printing parameters were set as follows: an extrusion pressure was 30 kPa, a printing speed was 250 mm/min, a movement speed was 900 mm/min, movement lifting was 0, a pullback speed was 2000 mm/min, a pullback length was 0, a printing manner was one-by-one printing, the biomaterial was printed on a culture dish which was placed on a receiving platform, and then a three-dimensional scaffold structure was formed by layer-by-layer stacking. A layer height of the three-dimensional scaffold had 0.8 mm and a layer number was 3 layers, the number of repeated printing was 1 time, a spacing was 1.5 mm×1.5 mm, an included angle was 90°, a length was 12 mm, a width was 12 mm, the Brim Width was 1 mm, and the Brim speed was 200 mm/min. Then, the three-dimensional scaffold was irradiated for 60 seconds by using UV light with a wavelength of 405 nm and a light intensity of 25 mW/cm$^2$, so that the cross-linking of the biomaterial was caused to form a three-dimensional hydrogel scaffold with a stable structure. And then, PBS was added into the hydrogel scaffold, the hydrogen scaffold was incubated for 24 hours at 4° C., to remove the sacrificial material of the Pluronic® F127 (Poloxamer 407) in the hydrogel scaffold.

The hydrogel scaffold was pre-cooled for 12 hours at −80° C., and then subjected to freeze drying for 24 hours at the freeze drying temperature of −55° C., so as to prepare an aerogel scaffold. The aerogel scaffold was sterilized in 75% ethanol for 3 hours, and then washed with PBS 5 times with 5 minutes each time to completely remove the ethanol. The sterilized aerogel scaffold was soaked in a complete culture medium, and then incubated for 24 hours in an environment of 37° C. and 5% $CO_2$, to functionalize the aerogel scaffold. A cell suspension, with a concentration of $10^6$ cells/mL, was added onto the functionalized aerogel scaffold, and then incubated in a cell incubator in an environment of 37° C. and 5% $CO_2$.

The porous aerogel scaffold obtained in the examples can be applied to a three-dimensional cell culture.

The advantages of the application of the porous aerogel scaffold obtained in the examples in the three-dimensional cell culture will be exhibited by several performance tests, as follows.

Figure 1B:
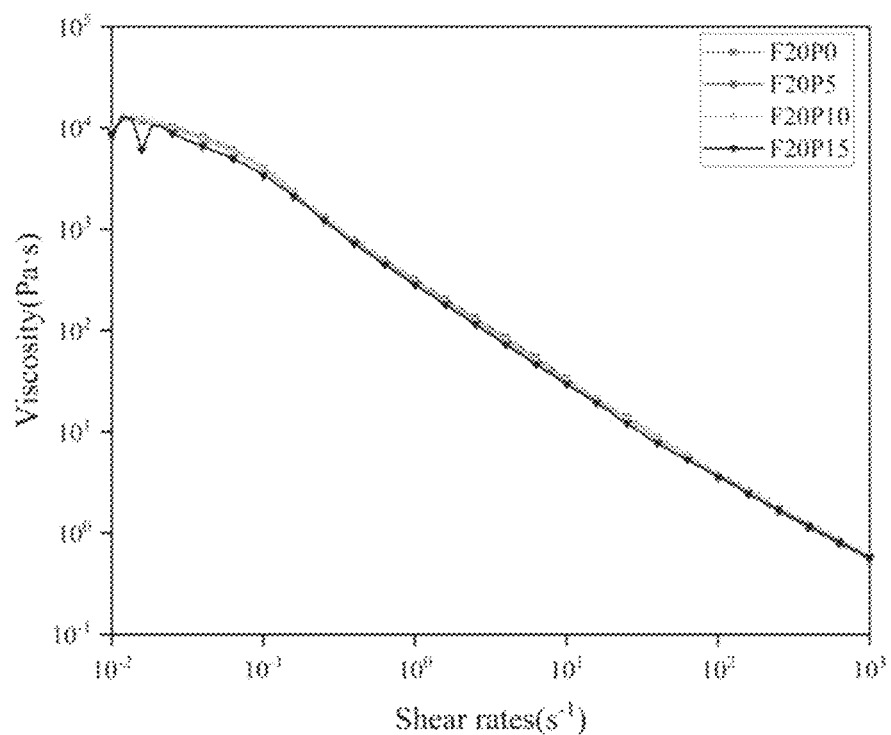
Figure 1C:
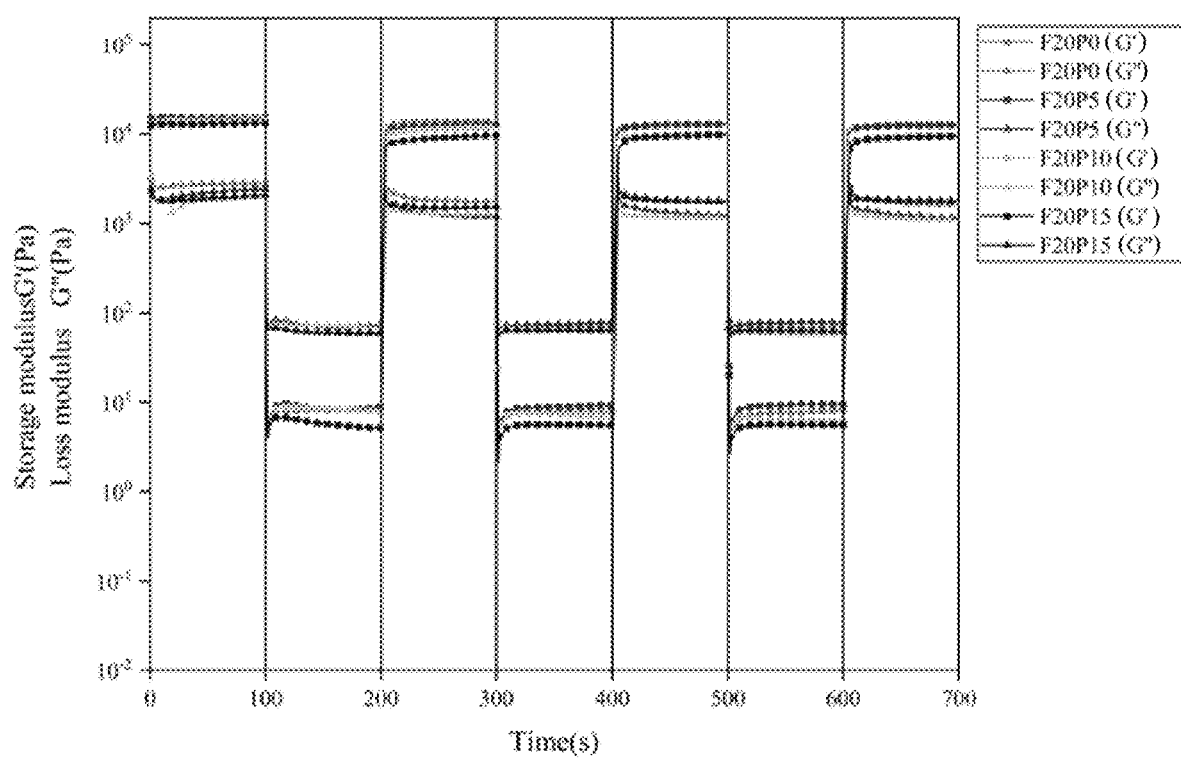

Test of rheological property: the rheology of the biomaterial was measured by using a rheometer, including gelation kinetics, shear thinning behavior and shear recovery behavior. When in gelation kinetic measurement, the strain was set as 1%, the frequency was set as 1 Hz, and temperature scanning was performed when the temperature rose from 4° C. to 37° C. at the heating rate of 5° C. $min^{-1}$; when in shear thinning measurement, the temperature was set as 37° C. and the shear rate was set as 0.01 to 1000 $s^{-1}$, and the change in the viscosity of the material with the shear rate was observed; when in shear recovery measurement, the frequency was set as 1 Hz, a low strain of 1% strain was applied within 100 seconds, then a high strain of 600% strain was applied within 100 seconds, and finally the low strain of 1% strain was restored within 100 seconds, three cycles were performed and the storage modulus G' and the loss modulus G" were recorded. The measurement results of the gelation kinetics, the shear thinning and the shear recovery are as shown in FIG. 1(a), FIG. 1(b) and FIG. 1(c), respectively, and samples in the example 1, the example 2 and the example 3 are marked as F20P5, F20P10 and F20P15 respectively, wherein 20 wt % of pure Pluronic® F127 (Poloxamer 407) is selected as control and marked as F20P0. The biomaterials in the example 1, the example 2 and the example 3 all can become gel at 37° C., and have shear thinning and shear recovery performances, indicating that the biomaterials in the example 1, the example 2 and the example 3 are applicable for extrusion-based 3D printing. In the process of the printing, the temperatures of the bucket and the receiving platform are set as 37° C., the material can be kept in a solid-like state in the bucket, and change into a liquid state when a pressure is applied to extrude the material, so as to smoothly achieve extrusion. When the material leaves from a nozzle and falls on the receiving platform, it can be rapidly restored into the solid-like state, thereby maintaining the stability of the printed structure.

Test of swelling capacity: the biomaterials in the example 1, the example 2 and the example 3 were prepared into a cylindrical aerogel structure with a diameter and a height being both 8 mm by photocuring, low-temperature soaking and freeze drying respectively, and a sample that was not subjected to low-temperature soaking was selected as control. The test of swelling capacity was performed, i.e., a weight (Wd) of a sample subjected to freeze drying was measured, then the sample was respectively soaked in PBS for 0/3/6/12/24 hours and taken out in corresponding time points, water on the surface of the sample was wiped, a weight (Ws) of the sample was weighed, and subsequently the swell ratio in each swelling time point was calculated by utilizing the following formula.

$$\text{Swell ratio} = (Ws - Wd)/Wd \times 100\%$$

Figure 2:
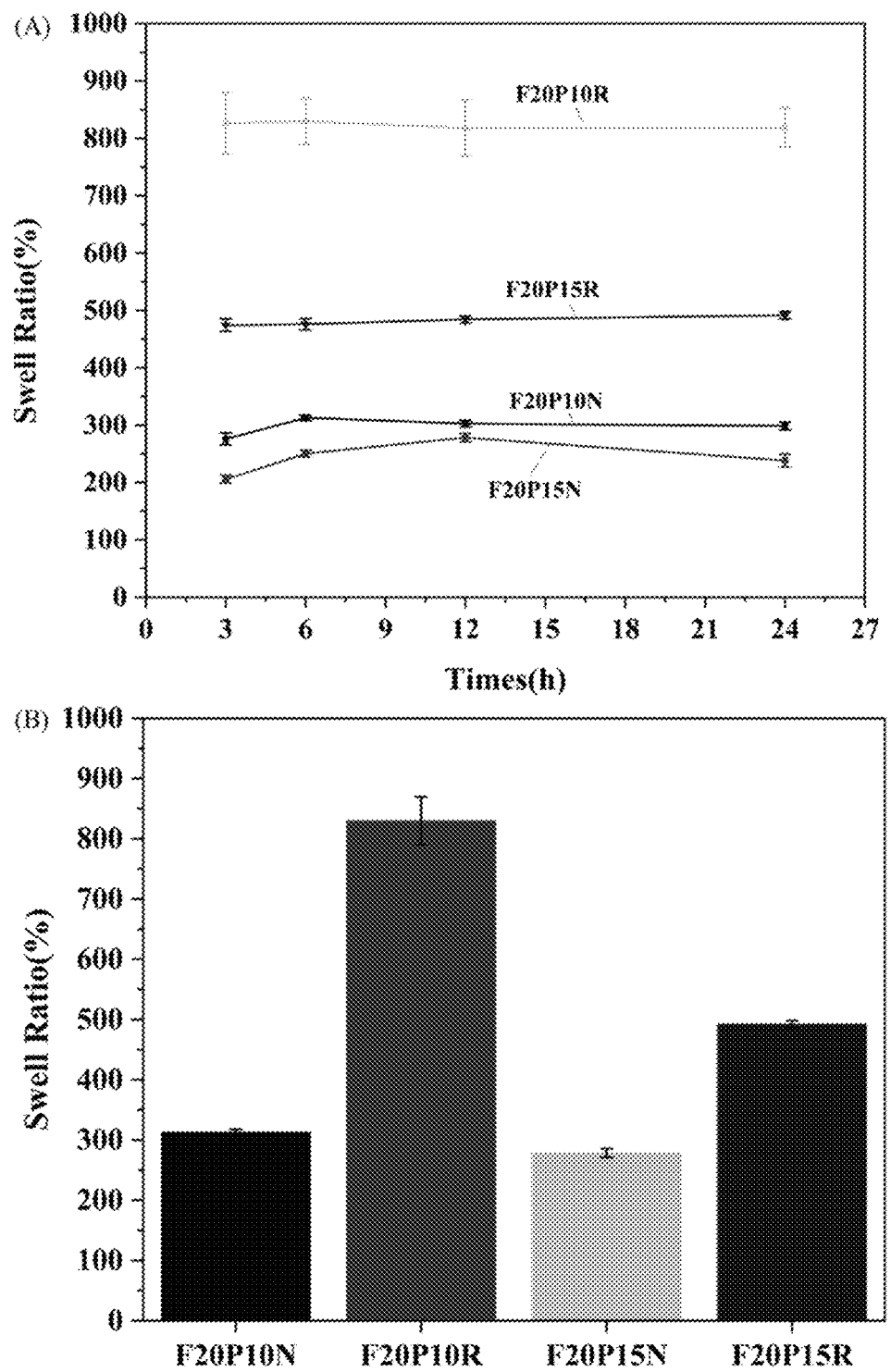
FIG. 2 includes diagrams showing swelling performances of aerogels prepared in the Example 2 and the Example 3 according to the present invention, wherein DIAG. A shows changes in swell ratios of aerogels in 3, 6, 12 and 24 hours, and DIAG. B shows maximum swell ratio values of aerogels.

Since the material in the example 1 could not be photocured, the materials in the example 2 and the example 3 were selected for the test of swelling capacity. The sample that was subjected to low-temperature soaking in the example 2 was marked as F20P10R, and the sample that was not subjected to low-temperature soaking in the example 2 was marked as F20P10N; the sample that was subjected to low-temperature soaking in the example 3 was marked as F20P15R, and the sample that was not subjected to low-temperature soaking in the example 3 was marked as F20P15N. The test results are as shown in FIG. 2, indicating that the swelling capacities in the example 2 and the example 3 are significantly improved after Pluronic® F127 (Poloxamer 407) is removed.

Microstructure: the biomaterials in the example 1, the example 2 and the example 3 were prepared into a cylindrical aerogel structure with a diameter and a height being both 8 mm by photocuring, low-temperature soaking, freeze drying and metal spraying respectively; a sample that was not subjected to low-temperature soaking was selected as control; the microstructure was observed under a scanning electron microscope.

Figure 3:
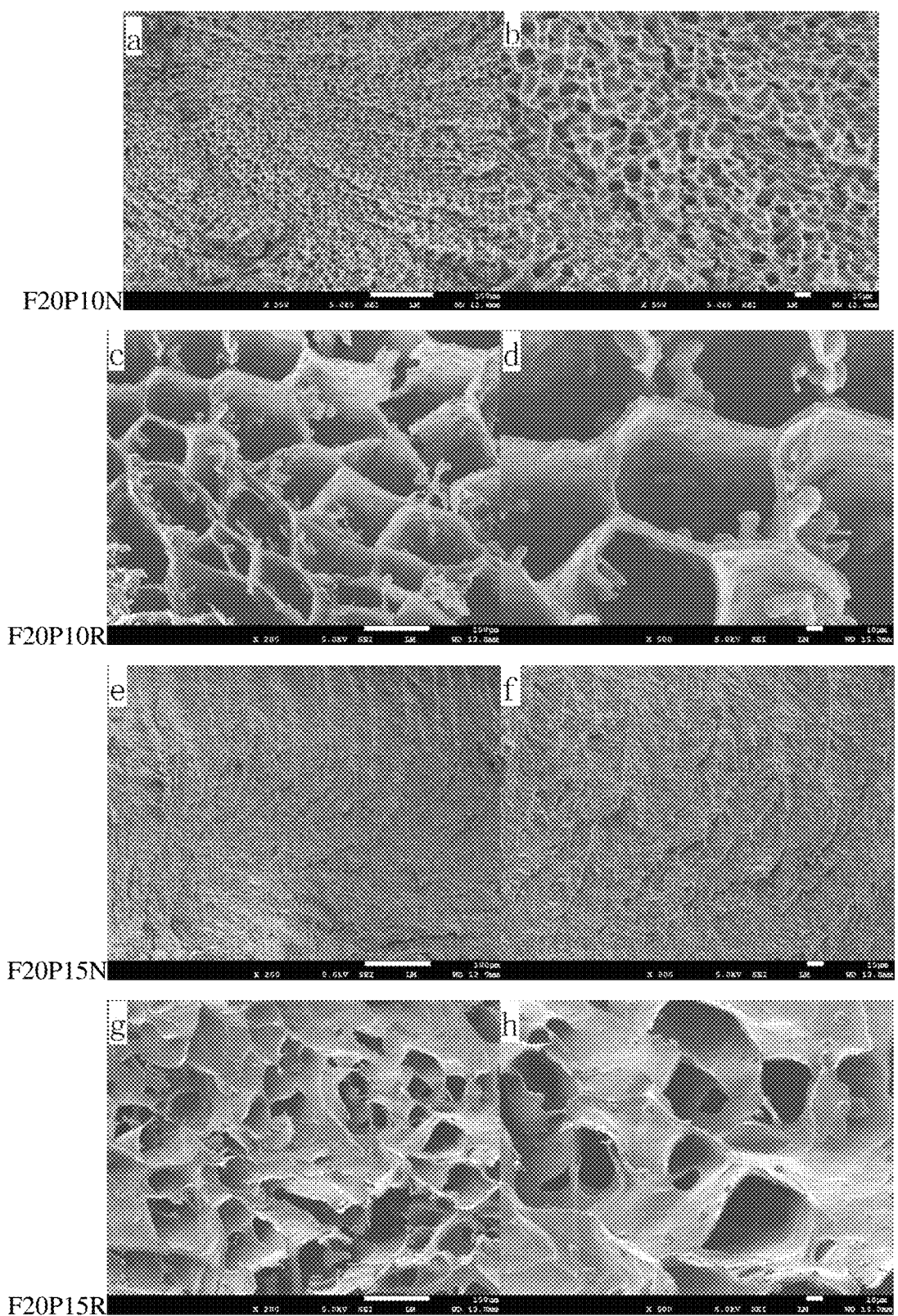
FIG. 3 includes scanning electron microscopy (SEM) images showing micro morphologies of aerogels prepared in the Example 2 and the Example 3 according to the present invention, wherein DIAG. a and DIAG. b show a micromorphology of an aerogel prepared in the Example 2 before removal of a Pluronic® F127 (Poloxamer 407), DIAG. c and DIAG. d show a micromorphology of the aerogel prepared in the Example 2 after removal of the Pluronic® F127 (Poloxamer 407), DIAG. e and DIAG. f show a micromorphology of an aerogel prepared in the Example 3 before removal of a Pluronic® F127 (Poloxamer 407), and DIAG. g and DIAG. h show a micromorphology of the aerogel prepared in the Example 3 after removal of the Pluronic® F127 (Poloxamer 407).

Since the material in the example 1 could not be photocured, the materials in the example 2 and the example 3 were selected for observation of microstructures. The sample that was subjected to low-temperature soaking in the example 2 was marked as F20P10R, and the sample that was not subjected to low-temperature soaking in the example 2 was marked as F20P10N; the sample that was subjected to low-temperature soaking in the example 3 was marked as F20P15R, and the sample that was not subjected to low-temperature soaking in the example 3 was marked as F20P15N. The observation results are as shown in FIG. 3, indicating that the size of the pore significantly increases after Pluronic® F127 (Poloxamer 407) is removed.

Test of mechanical property: mechanical properties were tested through a stretcher, the biomaterials in the example 2 and the example 3 were prepared into a cylindrical aerogel structure with a diameter and a height being both 15 mm by photocuring, low-temperature soaking and freeze drying respectively; when in the test, a compression rate was set as 2 mm/min, a compression distance was ½ that of the original size, a compression modulus was defined as the slope of 5% strain in a stress-strain curve, the compression moduli of the biomaterials in the example 2 and the example 3 after removal of Pluronic® F127 (Poloxamer 407) were obtained as 0.415±0.081 MPa and 0.818±0.141 MPa respectively, indicating that both the two scaffolds have relatively high mechanical properties, and therefore the scaffold structures can maintain good stability in the process of culture.

Figure 4:
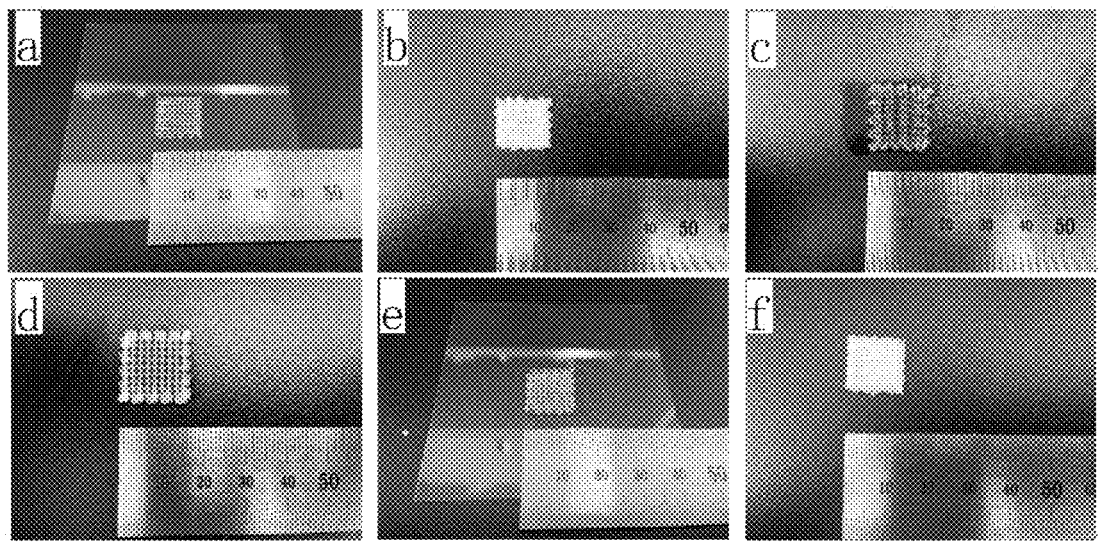
FIG. 4 includes images showing a preparation of an extruded 3D printing aerogel scaffolds in the Example 2 and the Example 3, wherein DIAG. a, DIAG. b and DIAG. c are the images respectively showing an original three-dimensional hydrogel scaffold, a dry aerogel scaffold and a wet aerogel scaffold in the Example 2, and DIAG. d, DIAG. e and DIAG. f are images respectively showing an original three-dimensional hydrogel scaffold, a dry aerogel scaffold and a wet aerogel scaffold in the Example 3.

Macrostructure of aerogel scaffold: original three-dimensional hydrogel scaffolds, dry aerogel scaffolds and wet aerogel scaffolds in the example 2 and the example 3 are as shown in FIG. 4 respectively, it can be seen that there is no significant change in the sizes of the aerogel scaffolds in the process of preparation, the wet aerogel scaffolds obtained after the dry aerogel scaffolds are soaked into PBS have obvious macro porous structures, which can provide a nutrient channel for cells implanted on the scaffolds.

Figure 5:
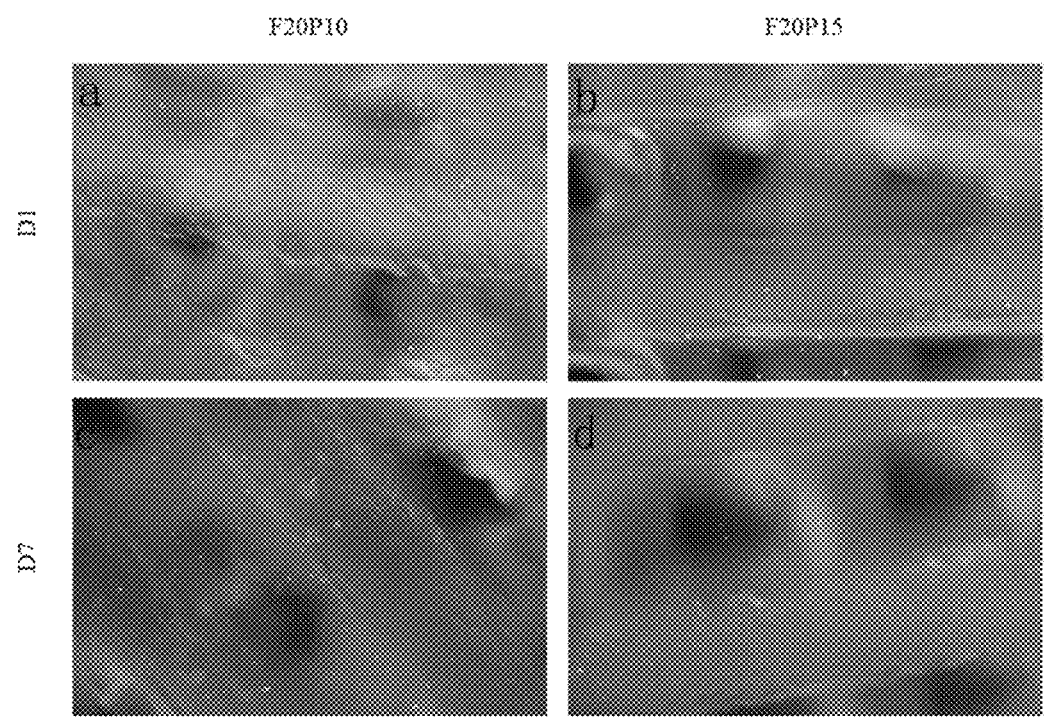
FIG. 5 includes images showing cell culture on aerogel scaffolds in the Example 2 and the Example 3 according to the present invention, wherein DIAG. a is a live/dead staining diagram of cells after 1 day of culture in the Example 2; DIAG. b is a live/dead staining diagram of cells after 1 day of culture in the Example 3; DIAG. c is a live/dead staining diagram of cells after 7 days of culture in the Example 2; DIAG. d is a live/dead staining diagram of cells after 7 days of culture in the Example 3.
Figure 6:
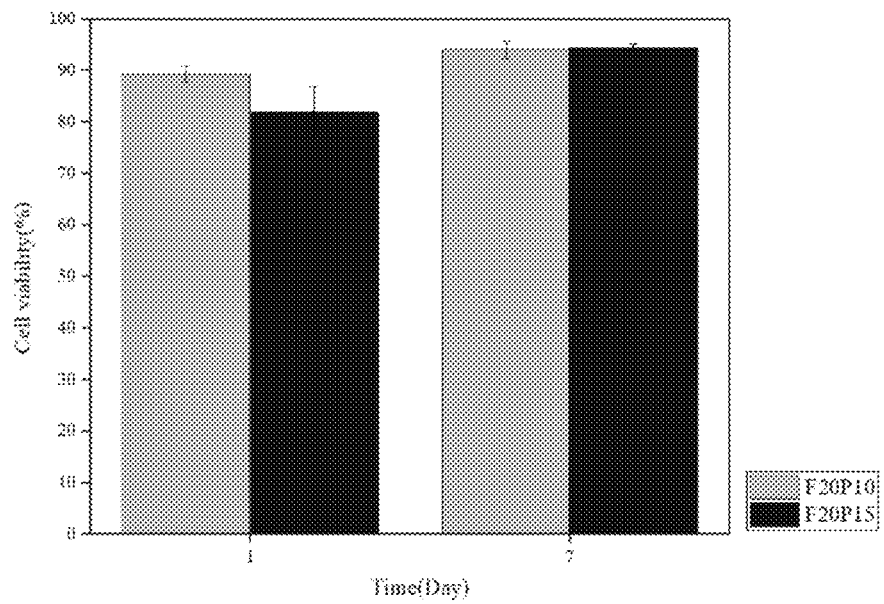
FIG. 6 is a diagram showing a comparison of cell viability on aerogel scaffolds in the Example 2 and the Example 3 according to the present invention.
Figure 7:
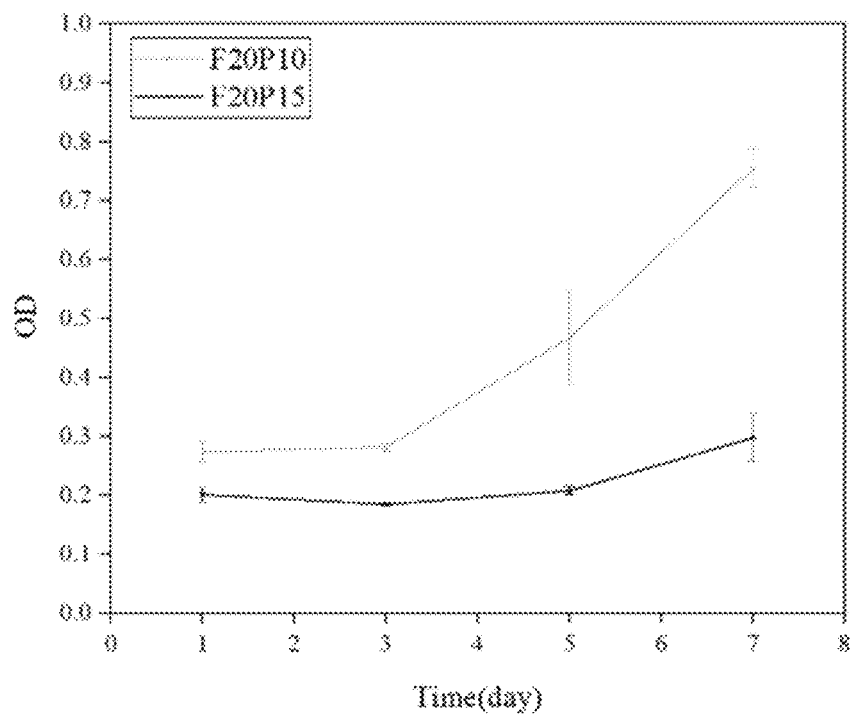
FIG. 7 is a diagram showing a proliferation of cell culture on aerogel scaffolds in the Example 2 and the Example 3 according to the present invention.

Characterization of cell viability: live/dead cells were respectively stained by using Calcein-AM/PI, and then the cell viability was characterized by using a fluorescence microscope. Calcein-AM can stain live cells and emits green fluorescence, and PI can stain dead cells and emits red fluorescence. FIG. 5 is a live/death staining diagram of cells after 1 day and 7 days of cell culture in the example 2 and the example 3, and FIG. 6 shows cell viability after 1 day and 7 days of cell culture in the example 2 and the example 3. The scaffold in the example 2 was marked as F20P10, and the scaffold in the example 3 was marked as F20P15. It can be seen that the viability of cells on the porous aerogel scaffolds prepared in the example 2 and the example 3 in the whole culture period are both greater than 80%, and over 90% on the 7th day.

Characterization of cell proliferation: the cell viability was characterized by a CCK-8 experiment. The scaffolds cultured for 1 day, 3 days. 5 days and 7 days were placed in a new 6-well plate and then washed twice with PBS. A complete culture medium and a CCK-8 solution were prepared into a working solution in a volume ratio of 10:1, 3 ml of the working solution was added into each the well, and then the 6-well plate was placed in an incubator to be incubated for 3 hours in an environment of 37° C. and 5% $CO_2$. After the incubation was completed, the culture plate was taken out, and then the incubation solution in the 6-well plate was transferred into a 96-well plate with 100 μL in each well. The 96-well plate where the incubation solution was added was put in an enzyme-linked immunosorbent assay (ELISA) reader to measure the absorbance at 450 nm. FIG. 6 shows the cell proliferation in the example 2 and the example 3 when culture for 1 day, 3 days, 5 days and 7 days, the scaffold in the example 2 is marked as F20P10, and the scaffold in the example 3 is marked as F20P15. It can be seen that cells on the porous aerogel scaffolds prepared in the example 2 and the example 3 can proliferate well.

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method of three-dimensional (3D) cell culture comprising the following steps:
    adding a photoinitiator and polyethylene glycol diacrylate in a buffer solution, heating to dissolve and mix evenly, then adding Poloxamer 407 into the mixed solution, and leaving to stand at low temperature to obtain an aerogel scaffold material; and printing a hydrogel scaffold by using a 3D printing technology, and performing an ultraviolet (UV) irradiation on the printed hydrogel scaffold to generate a cross-linkage, then forming a structurally stable 3D scaffold, performing a low-temperature soaking to remove the Poloxamer 407, performing a freeze drying to obtain the porous aerogel scaffold;
    wherein, the photoinitiator is a lithium phenyl-2,4,6-trimethylbenzoylphosphinate (LAP) photoinitiator; in the buffer solution, a concentration of the LAP photoinitiator is 0.1-0.25 wt %, a concentration of polyethylene glycol diacrylate is 10-15 wt %, and a concentration of the Poloxamer 407 is 15-25 wt %;
    performing the low-temperature soaking of the 3D scaffold by using phosphate buffered saline (PBS), to remove the Poloxamer 407; wherein a temperature of the low-temperature soaking is 0-5° C., a duration time of the low-temperature soaking is 20-30 h; and a temperature of the freeze drying is −60-−50° C., and a duration time of the freeze drying is 20-30 h;
    performing a soaking sterilization on the porous aerogel scaffold by using an ethanol solution, soaking the sterilized porous aerogel scaffold in a complete culture medium, incubating at 37° C., 5% $CO_2$ for 20-30 h, carrying out a functionalization of the porous aerogel scaffold; and, adding a cell suspension solution to the functionalized porous aerogel scaffold and culturing in a cell incubator at 37° C. and 5% $CO_2$.

2. The method according to claim 1, wherein: the buffer solution is the phosphate buffered saline (PBS).

3. The method according to claim 1, wherein: a temperature of the low-temperature standing of the aerogel scaffold material is 0-5° C., and a duration time of the low-temperature standing is 2-5 days.

4. The method according to claim 1, wherein: a wavelength of the UV light is 405 nm; an intensity of the UV light is 20-30 $mW/cm^2$, and an irradiation time is 5-15 min.

5. The method according to claim 1, wherein: the temperature of the low-temperature soaking is 4° C., and the duration time of the low-temperature soaking is 24 h.

* * * * *